United States Patent [19]
Ota et al.

[11] Patent Number: 6,163,383
[45] Date of Patent: Dec. 19, 2000

[54] METHOD FOR PROVIDING PRINT OUTPUT SECURITY IN A MULTINETWORK ENVIRONMENT

[75] Inventors: Hiromi Ota; Hayato Kinosita, both of Kanagawa, Japan

[73] Assignee: Fuji Xerox Co., Ltd., Tokyo, Japan

[21] Appl. No.: 08/843,658

[22] Filed: Apr. 16, 1997

[30] Foreign Application Priority Data

Apr. 17, 1996 [JP] Japan .................................. 8-095014
Apr. 26, 1996 [JP] Japan .................................. 8-106600

[51] Int. Cl.$^7$ ........................................................ G07D 7/00
[52] U.S. Cl. ............................. 358/11.4; 340/825.34; 709/225; 709/229
[58] Field of Search .................................. 395/114, 186, 395/187.01, 188.01, 101–113, 115–117, 200.55, 200.59; 364/709.05; 358/443, 445, 447–460, 528, 530–38, 462–467; 382/254–275; 380/25, 49; 340/825.34

[56] References Cited

U.S. PATENT DOCUMENTS

| | | | |
|---|---|---|---|
| 5,220,674 | 6/1993 | Morgan et al. | 395/800 |
| 5,604,490 | 2/1997 | Blakeley, III et al. | 340/825.31 |
| 5,638,511 | 6/1997 | Nezu | 395/187.01 |
| 5,771,354 | 6/1998 | Crawford | 395/200.59 |
| 5,781,725 | 7/1998 | Saito | 395/187.01 |

FOREIGN PATENT DOCUMENTS 7-148996  6/1995  Japan .

OTHER PUBLICATIONS

OS/390 v1R3.0 Security Server (RACF) Security Administrators Reference, 1994.
OS/390 SDSF Guide and Reference, Topic 1.1, 1998.
OS/390 V1R4.0 Security Server (RACF) Introduction, Topic 2.0, 1997.
IBM Vocabulary for Data Processing, Telecommunications, and Office Systems, 7th Edition, Jul. 1981.
OS/390 SDSF Customization and Security, Topics 2.1,2.2.4.1, 2.2.4.2, 5.0, 5.2, 1998.

*Primary Examiner*—Mark Zimmerman
*Assistant Examiner*—Lance W. Sealey
*Attorney, Agent, or Firm*—Finnegan, Henderson, Farabow, Garrett & Dunner, L.L.P.

[57] ABSTRACT

When an operation relating to print processing is to be instructed, a user information producing section produces an identification of a user and transmits the operation in a user name to which the identification is attached. A correctness inquiry judging section judges whether it is necessary to verify correctness of the identification, in accordance with a security policy stored in a support authentication level storing section. If necessary, a user verifying section is requested to verify the correctness. The user verifying section performs user verification corresponding to an authentication level. In a high level, reverification of the identification is performed by an authenticating section. In a middle level, user authentication based on an authentication scheme of the client environment is used. In a low level, the system believes the user name designated by the user. An operation controlling section judges whether the operation is allowed to the verified user.

6 Claims, 6 Drawing Sheets

FIG. 5

USER AUTHENTICATION LEVEL DEFINITION TABLE

| ENVIRONMENT IDENTIFYING NAME | AUTHENTICATION LEVEL |
|---|---|
| LOCAL MACHINE 1 | LOW |
| NETWORK 1 | HIGH |
| ⋮ | ⋮ |

FIG. 6

SECURITY POLICY DEFINITION TABLE

| AUTHENTICATION LEVEL | METHOD OF CONFIRMING CORRECTNESS |
|---|---|
| HIGH | REQUESTING AN IDENTIFICATION FROM AUTHENTICATION SERVER |
| MIDDLE | REQUESTING AN IDENTIFICATION FROM AUTHENTICATION SCHEME OF CLIENT ENVIRONMENT |
| LOW | (UNNECESSARY) |
| UNCONDITIONAL EXECUTION | (UNNECESSARY) |

FIG. 7

ENABLED OPERATION DEFINITION TABLE

| KIND OF OPERATION | EXECUTABLE AUTHENTICATION LEVEL |
|---|---|
| JOB TRANSFER TO OTHER PRINTER | HIGH |
| JOB CANCELLATION | BY HIGH   FOR MIDDLE |
| READ OF PROCESSING STATE | LOW |
| ⋮ | ⋮ |

METHOD FOR PROVIDING PRINT OUTPUT SECURITY IN A MULTINETWORK ENVIRONMENT

BACKGROUND OF THE INVENTION

The invention relates to a print processing apparatus, and particularly to a print processing apparatus for performing an access control in which print instructions sent in the form of various protocols from clients connected to a network are received, the print instructions are associated with various user authentication schemes on the side of clients, and each user is judged to determine whether the user is allowed to use various operations for a printer.

In a multiprotocol network print apparatus of the prior art, there is a need to perform an access control in the unit of a user in such a manner that a user in a certain protocol is allowed to perform a print operation but not allowed to perform other operations, or that a cancel operation for a print operation of user's own is allowed but a cancel operation for a print operation of another user in another protocol is not allowed.

Specifically, there is a case where an access control in which a user of UNIX (registered trademark licenced in U.S.A. and other countries by X/Open Co., Ltd., hereinafter this indication will be omitted) is inhibited from canceling by using a protocol of Lpr a print operation of a user of NetWare (registered trademark of Novell, Inc., U.S.A., hereinafter this indication will be omitted) in a protocol of NetWare, and a print operation of a user of Macintosh (registered trademark of Apple Computer, Inc., U.S.A., hereinafter this indication will be omitted) in a protocol of AppleTalk (trademark of Apple Computer, Inc., U.S.A., hereinafter this indication will be omitted).

When a protocol of Lpr in UNIX is used, for a multiuser system of UNIX, a user can cancel a print operation of the user but cannot cancel a print operation of another user. By contrast, the administrator can perform a control in which all print operations are canceled.

With respect to print jobs received in the form of multiprotocol, the administrator can cancel any of the jobs. By using a protocol of AppleTalk, therefore, the administrator can cancel even a print operation of a Macintosh user.

In a network print apparatus which is configured so as to receive print instructions in a plurality of protocols, it must be verified that a user who makes a request is a correct user, in order to perform an access control in the unit of a user. However, forms of user authentication vary with protocols. For example, instructions of a certain protocol include information which can authenticate a user. In another case, instructions include information which can be used only for identification in the unit of a client and not in the unit of a user. In another case, although the name of a user may be identified, such information is not entirely reliable because no authentication scheme is provided. When an access by the user is to be controlled in multiprotocol print processing, therefore, print instructions from all protocols cannot be subjected to user authentication by the same method, thereby producing a problem in that various authentication schemes must be prepared.

A print apparatus of the prior art has a further problem that delicate access controls such as only a specific user is allowed to make color printing, to use an OHP sheet, or to use a font including a formal logo symbol of a company, cannot be performed.

SUMMARY OF THE INVENTION

The invention has been made in view of the foregoing problems. It is an object of the invention to provide a print processing apparatus in which, when an access control such as print instructions are received from a plurality of protocols and the use of a certain printer is allowed only to a specific user, is to be done, user authentication is performed in different manners depending on clients by using a user authentication scheme which is most reliable to the respective users.

It is another object of the invention to provide a print processing apparatus in which an access by a user relating to print processing can be controlled more delicately.

According to the invention, a print processing apparatus is provided which processes print instructions in plural protocols, comprising: user information producing means for producing an identification which identifies a user as a sole user in an environment of a client; operation instructing means for issuing instructions of operations relating to print processing while transmitting the identification; authenticating means for performing a service of user authentication; support authentication level storing means for storing a security policy as to whether or not it is required to verify correctness of the identification; correctness inquiry judging means for, when receiving the operation output from said operation instructing means, judging whether or not correctness of the identification is to be inquired, in accordance with the security policy; user verifying means for, when it is judged that correctness is to be inquired, verifying correctness of the user in response to inquiry of correctness of the identification; and operation controlling means for restricting operations on a printer to an operation which is allowed to the user verified by said user verifying means.

BRIEF DESCRIPTION OF THE DRAWINGS

FIG. 5 is a view showing a user authentication level definition table.

FIG. 6 is a view showing a security policy definition table.

FIG. 7 is a view showing operations which can be executed.

DETAILED DESCRIPTION OF THE INVENTION

Preferred embodiments of the invention will now be described with reference to the accompanying drawings.

Figure 1:
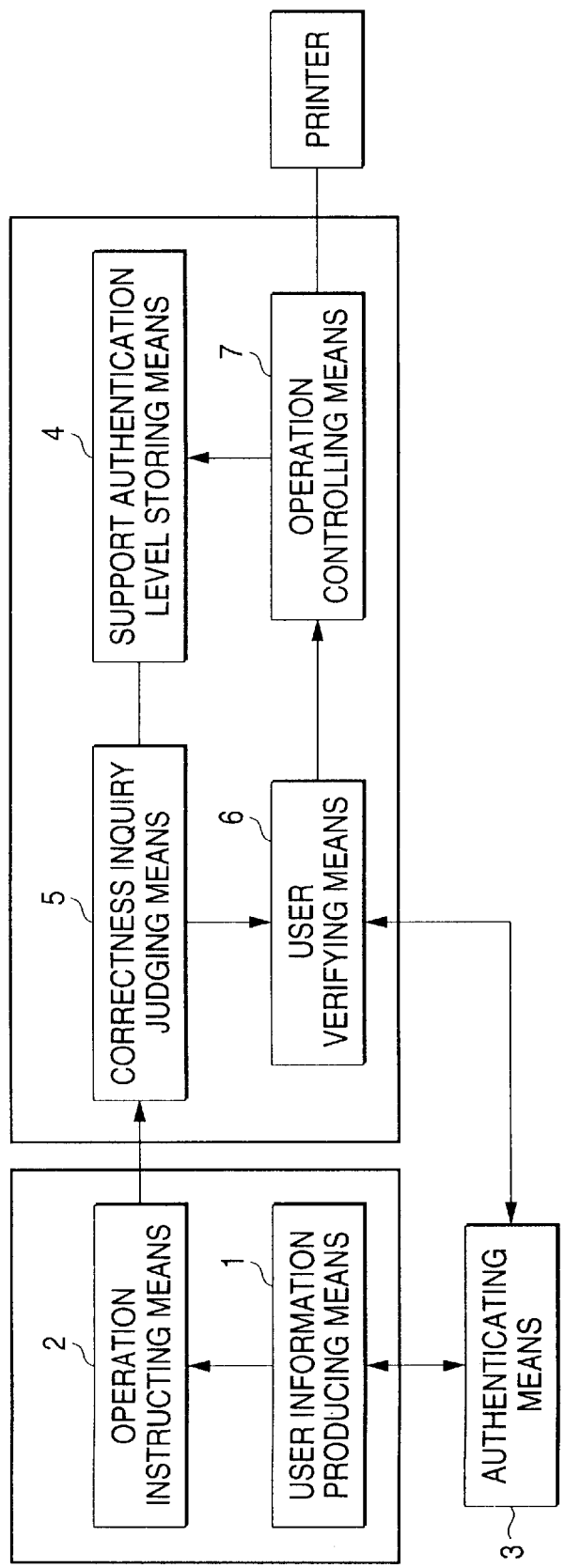
FIG. 1 is a diagram showing the principle of the configuration of a print processing apparatus of the invention.

First, the principle of the configuration of a print processing apparatus of the invention will be described with reference to FIG. 1.

The print processing apparatus of the invention comprises: user information producing means 1 and operation instructing means 2 which are disposed in each of plural clients; authenticating means 3 which is disposed in a network, for example, in an authentication server; support authentication level storing means 4 which is disposed in a print server; correctness inquiry judging means 5; user verifying means 6; and operation controlling means 7.

The user information producing means 1 produces an identification which identifies a user as a sole user in the environment of a certain client. Depending on the environment of the client, the means may produce an identification in one of the following manners: the means requests the authenticating means 3 to produce an identification; and an identification is produced by an authentication scheme provided by the operating system of the client or the like. In the case where no scheme for authenticating the user is not provided in the environment of the client, an identification without the name of the user is produced. In accordance with the method of producing the identification, the security level varies. In the case where an authentication scheme by a mechanism of a third party such as the authenticating means 3 is used, the authentication level is set to be at a high level, in the case where a local authentication scheme to which the client belongs is used, the authentication level is set to be at a middle level, and in the case where no authentication scheme is used, the authentication level is set to be at a low level. The operation instructing means 2 requests the print server operations relating to print processing such as the print operation and the cancel operation while transmitting the user name designated by the user and the produced identification.

In the print server, the support authentication level storing means 4 stores a security policy as to whether or not it is required to verify correctness of the identification. The correctness inquiry judging means 5 receives the operation output from the operation instructing means 2, and judges whether or not correctness of the identification is to be inquired, in accordance with the security policy stored in the support authentication level storing means 4. If the correctness inquiry judging means S judges that correctness is to be inquired and requests inquiry of correctness of the identification, the user verifying means 6 verifies correctness of the user in response to the inquiry. The operation controlling means 7 performs a control of restricting operations on the printer to an operation which is allowed to the user verified by the user verifying means.

More specifically, when the print server receives the operation output from the operation instructing means 2, the correctness inquiry judging means 5 checks the identification against the security policy of the support authentication level storing means 4, and judges whether or not correctness of the identification is to be verified. If it is judged that it is required to verify correctness of the identification, the correctness inquiry judging means 5 transfers the user name and the identification to the user verifying means 6 and requests the means to judge whether or not the identification is correct. When the authentication level is high, the user verifying means 6 receiving the request inquires of the authenticating means 3 which issued the identification in the production of the user information, about the correctness of the identification. In response to the inquiry, the authenticating means 3 notifies the user verifying means 6 of the result. The user verifying means 6 verifies the user on the basis of the notification from the authenticating means 3. If the user verifying means 6 judges that the authentication level is the middle level, the user verifying means 6 compares the user name in the identification with that designated by the user. If the user names coincide with each other, the user is identified as the person of the identification, with the result that the user is identified. If the user verifying means 6 judges that the authentication level is the low level, the user verifying means 6 believes the user name designated by the user and identifies the user as the person of the identification, with the result that the user is identified. When the user verifying means 6 identifies the user in this way, the operation controlling means 7 judges whether or not the requested operation is an operation allowed to the user. If the requested operation is an operation allowed to the user, the operation is requested to the printer.

If there is an object which is not allowed to be used by the user, access control information judging means judges whether the object is not used, an alternative object is used, or the print operation is stopped. The printer performs processing in accordance with the judgement.

Even when a request of an operation in the same user name is received, therefore, the request can be identified as the one made by another user by setting an authentication level and identifying the level. According to this configuration, even when a cancel operation for a job received in the low authentication level (in which no authentication scheme is used) is requested by an unauthorized use of a user name, for example, the job cannot be freely canceled. Since the middle authentication level is used, it is not necessary to introduce a very severe authentication system (authentication server) unlike the case of using the high authentication level. Therefore, the print processing apparatus can be configured at a low cost.

Furthermore, it is possible to perform fine access controls in which it is judged for each user whether the user can use an operation allowed to specific users, such as costly color printing, the use of an OHP sheet, or provision of a cover for printed documents.

Hereinafter, an embodiment in which the invention is applied to a network print apparatus will be described.

Figure 2:
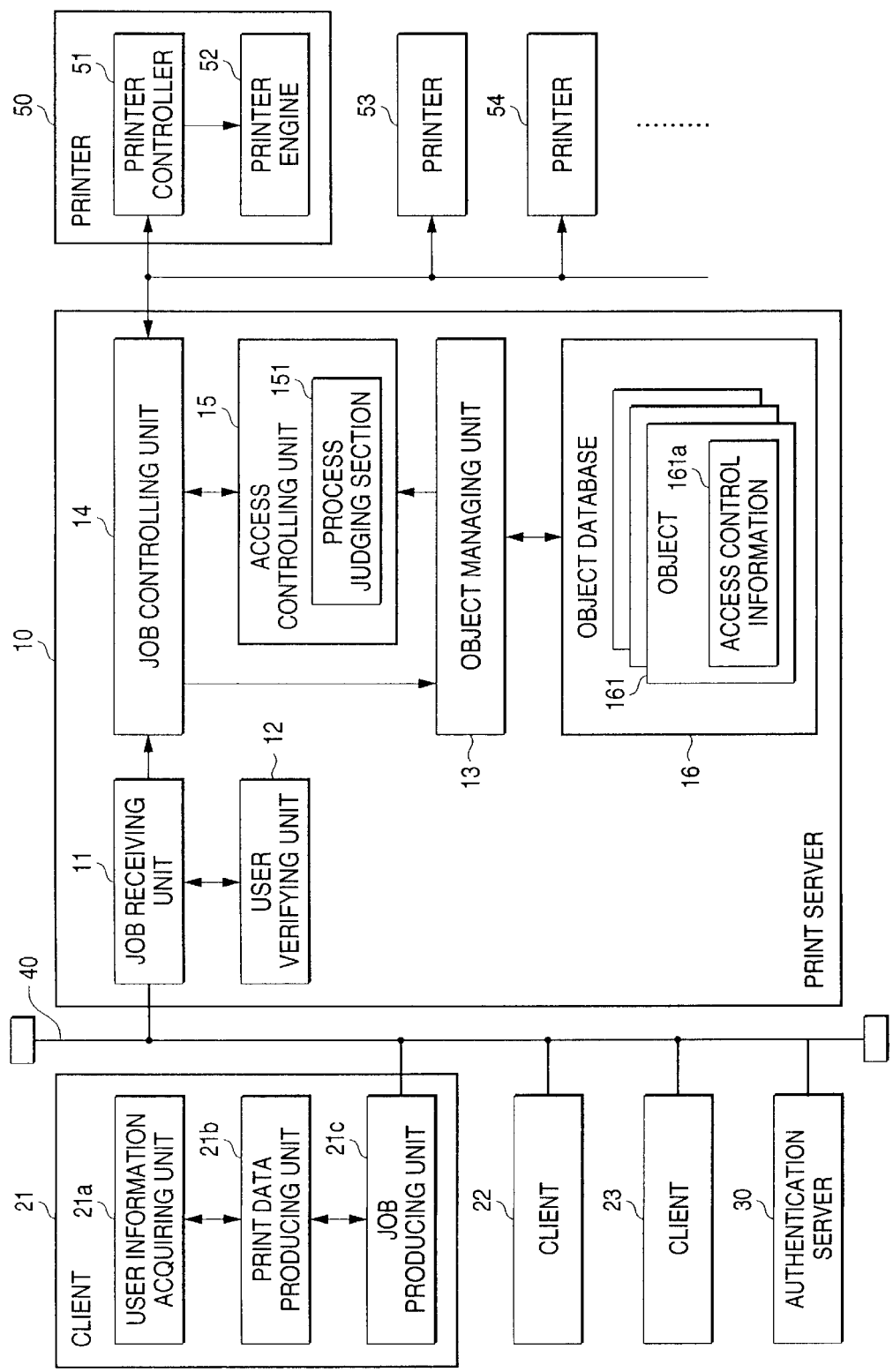
FIG. 2 is a block diagram schematically showing a network print apparatus.

FIG. 2 is a block diagram schematically showing the network print apparatus.

Referring to the figure, the network print apparatus comprises a print server 10, plural clients 21, 22, 23, and an authentication server 30. These components are connected to each other through a network 40. At least one printer 50 is connected to the print server 10.

The print server 10 has a job receiving unit 11 which receives a job from the clients 21, 22, 23, a user verifying unit 12 which verifying the user of the received job, a job controlling unit 14, an object managing unit 13, an access controlling unit 15, and an object database 16. The client 21 has a user information acquiring unit 21a, a print data producing unit 21b, and a job producing unit 21c. The other clients 22, 23 have the same configuration. The printer 50 has a printer controller 51 and a printer engine 52.

In the client 21, for example, the user information acquiring unit 21a is a unit which produces an identification of a user. The identification is produced by an authentication scheme which is employed in the environment to which the client 21 belongs. For example, the authentication server 30 which is an authentication scheme of a third party is requested so as to perform user authentication and issues the identification, or the identification is produced on the basis of the user identifier logged in the client environment. In some client environments, no authentication scheme is provided and the concept of a user does not exist. In such a case, an identification which is blank or has no contents is produced. Depending on the method of producing the identification, there are a plurality of authentication levels respectively corresponding to security levels, from the view point of security. Specifically, when user authentication is performed by, for example, the authentication server 30 or other name managing server, the authentication level is set to be at the high level. When user authentication is performed by an authentication scheme in the client environment, the authentication level is set to be at the middle level, and, when no authentication scheme is used, the authentication level is set to be at the low level.

The print data producing unit 21b has a function of producing print data such as text data, a page-description language, or a bit map, from documents produced by various application software, and corresponds to the printer driver in, for example, Windows (registered trademark of Microsoft Corporation, U.S.A.) environments. The job producing unit 21c is a unit for producing one job containing a method of processing the print data produced by the print data producing unit 21b, and information indicative of the attribute of the print data. For example, the method of processing the print data includes designation of the number of copies, and that of one- or two-sided printing, and the information indicative of the attribute of the print data includes data of the resolution of the produced print data, and those indicating whether the print data are produced in monochrome or color. In the transmission of the job from the job producing unit 21c to the print server 10, the job is transmitted together with user information consisting of the user name designated by the user and the identification produced by the user information acquiring unit 21a.

In the print server 10, when a job including print data, and user information are sent together with print instructions from the client 21, for example, the job receiving unit 11 receives them, and the user who has given the print instructions is verified on the basis of the user information by using the user verifying unit 12. The user verifying unit 12 verifies whether or not the information indicated by the user information acquiring unit 21a and relating to the user is correct. From the user information, the user verifying unit 12 judges the kind of the authentication scheme which is required for the user verification. If necessary, correctness of the identification is verified by using the authentication server 30, etc. When the user is verified, the job receiving unit 11 transfers the job to the job controlling unit 14 in order to perform the print processing indicated in the job.

The job controlling unit 14 gives print instructions to the printer controller 51 of the printer 50 while inquiring the object managing unit 13 whether an object required for the print operation indicated in the job exists, or the access controlling unit 15 whether the user has authority to access the object required for the print operation. With respect to the states and existence of objects stored in the object database 16, contents of information, and the like, the object managing unit 13 answers an inquiry from the job controlling unit 14 or the like. Upon receiving an inquiry from the job controlling unit 14 about whether the verified user has authority to access the object required for the print operation, the access controlling unit 15 answers the inquiry.

In the printer 50, upon receiving the instructions from the job controlling unit 14, the printer controller 51 generates a control code suitable for the printer engine 52 which actually performs the print operation, and sends the code to the printer engine 52, so that a print output is obtained from the printer engine 52.

Here, the procedure of authentication of a user which is performed in the case where the user gives print instructions to the print server 10 through an arbitrary client, will be described.

The user verifying unit refers to a user authentication level definition table shown in FIG. 5 and identifies the authentication level for the given environment identifier of the user. Thereafter, the unit refers to a security policy definition table shown in FIG. 6 and verifies correctness of the identified authentication level.

When the authentication level is high, the client requests the authentication server to issue an identification. In the case where the user has been authenticated, the authentication server issues an identification. With attaching the issued identification, the user requests through the client the print server to perform the operation. The print server inquires the authentication server whether the user identification is correct or not. If the authentication server judges that the identification is correct and notifies the print server of it, the print server recognizes the user as the person of the identification.

When the authentication level is the middle level, the user information acquiring unit requests the authentication scheme used in the client environment to issue an identification. In the case where the user has been authenticated in the authentication scheme, the user information acquiring unit issues a new identification on the basis of the identification used in the client environment. With attaching the issued identification, the user requests through the client the print server to perform the operation. On the basis of the identification of the user, the print server compares the user name authenticated in the client environment with that designated by the user in the request of the operation. If the user names coincide with each other, the print server recognizes the user as the person of the identification.

When the authentication level is low, the user issues a new identification indicating that there is no name certified in the client environment, through the client to the print server. Based on the new identification, the print server recognizes the user as a user who has no name certified in the client environment.

In practice, as shown in the security policy definition table of FIG. 6, also an unconditional execution level is also provided as a further security level in addition to the above-described three levels. In the unconditional execution level, no security is considered, or all operations can be executed through any client in order that the system may be applied to a very small network print apparatus. Alternatively, the user verifying unit 12 of the print server 10 may set combinations of the three levels or the high, middle, and low levels except the level in which all clients can unconditionally access the print server or no security is considered. In this case, a user of a higher level has a stronger right. For example, the high and middle levels are set as the user authentication level for an operation of canceling jobs as shown in FIG. 7. In this case, a user of the high level has authority to perform execution on a user of the middle level.

However, the success of execution of the subsequent operations depends on whether the judgement of the access controlling unit 15 allows the user to access an object required for processing, for example, the print operation.

For example, such objects include information relating to the method of processing print data such as designation of the number of copies, and that of one- or two-sided printing, and information relating to features of print data such as the resolution, monochrome or color, the scan size, and the use of a logo font of a company name.

The access controlling unit 15 receives data relating to the object retrieved by the object managing unit 13, and sends instructions corresponding to access control information attached to the object, to the job controlling unit 14. The object obtained from the object managing unit 13 is the answer to the inquiry from the job controlling unit 14 to the object managing unit 13 about an object required for print processing. on the basis of the access control information of the object, the access controlling unit 15 judges whether the user holding the print job has authority to access the object indicated in the print job. If allowance of use to the user is indicated in the access control information, the access controlling unit 15 instructs the job controlling unit 14 so as to perform print processing by using the object indicated in the print job. If allowance of use to the user is not indicated in the access control information, the access controlling unit causes a processing judging section 151 to judge the manner of performing print processing, and gives a result of the judgment to the job controlling unit 14 as instructions.

The processing judging section 151 is in the access controlling unit 15 and, in the case where allowance of use to the user is not indicated in the access control information, judges the manner of performing print processing. Specifically, on the basis of the definition relating to the provision for the case where there is no use allowance, the processing judging section 151 decides for each of objects (not shown) that the print job is executed without using the corresponding object, that the print job is executed by selecting an alternative object and using the selected object, or that the print job itself is stopped.

Figure 8:
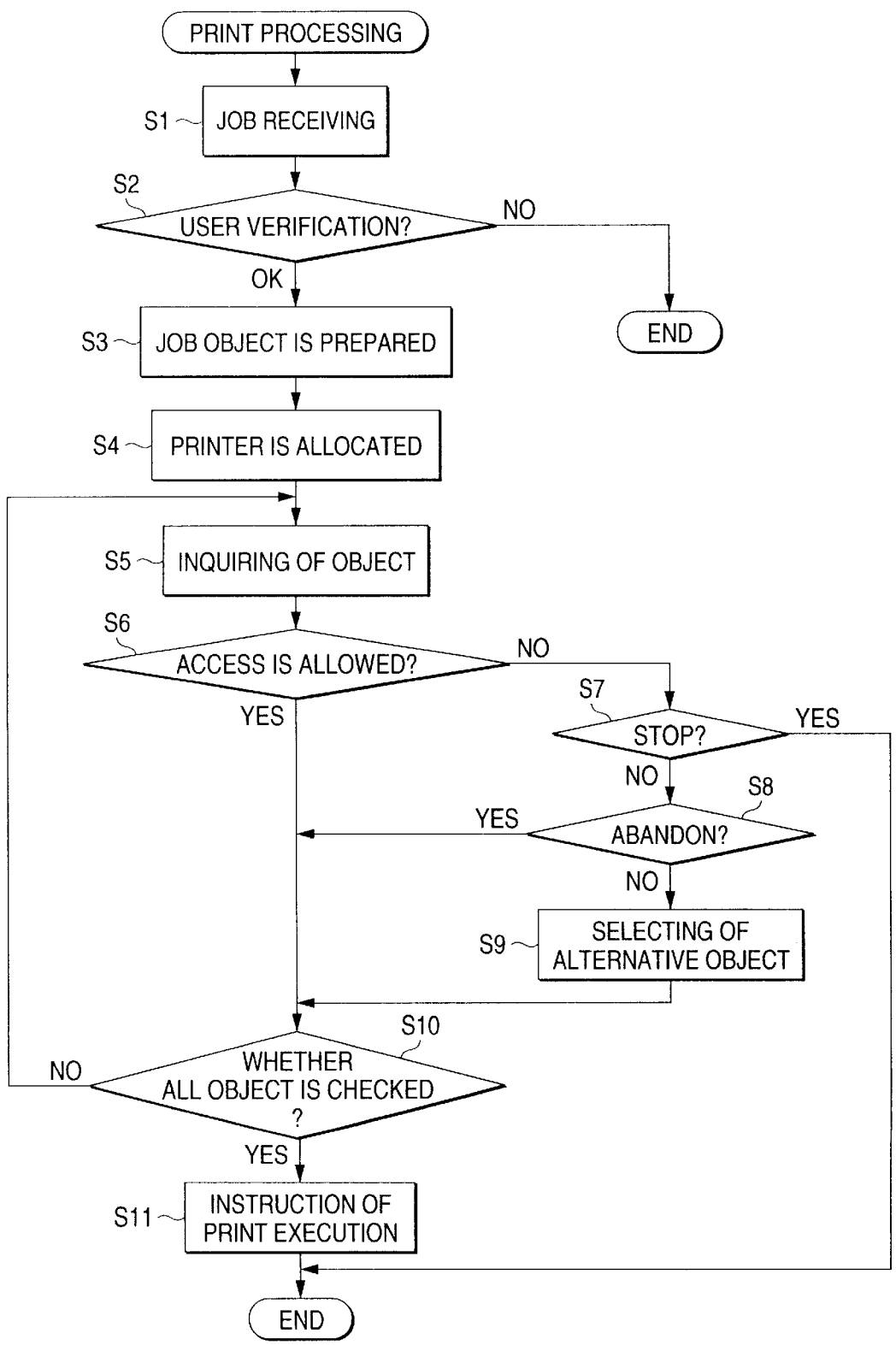
FIG. 8 is a flow chart showing the flow of an access control in which it is judged whether or not a user is allowed to use an object.

FIG. 8 is a flow chart showing the flow of processing in the print server.

In the figure, each number subsequent to S indicates a step number. The flow of processing in the print server will be described in the sequence of the step numbers.

[S1] The job receiving unit 11 receives the job issued from an arbitrary client through the network 40.

[S2] The job receiving unit 11 extracts user information, and requests the user verifying unit 12 to verify the information. If correctness of the user is verified, the process proceeds to step S3 and the print processing is continued. If correctness of the user is not verified, the job is destroyed, and this processing is ended.

[S3] The job receiving unit 11 notifies the job controlling unit 14 of the reception of the job. The object managing unit 13 then produces a job object of the received job, and stores it in the object database 16. At this time, the user who produces the job is set to be the holder of the job.

[S4] The job controlling unit 14 allocates a printer to the received job. When the process then reaches the timing for processing the received job, the job controlling unit 14 transfers the job to the allocated printer. For the sake of description, hereinafter, it is assumed that the printer which is allocated to the job is the printer 50.

[S5] The printer controller 51 in the printer 50 which has received the job checks the additional information indicated in the job, and inquires the object managing unit 13 through the job controlling unit 14 whether the user holding the job is provided with the use allowance for the object required for printing.

For example, the controller inquires whether the uses of objects of black and red toners, an object of two-sided printing, and the font object of the logo of the company name are allowed to the user holding the job.

[S6] The object managing unit 13 which has received the inquiry searches the object database 16 for a corresponding object. If a corresponding object exists, the data of the object are transmitted to the access controlling unit 15. The access controlling unit 15 which has received the data judges whether the user holding the job is allowed to use the object, based on the access control information set in the object. If it is judged that the use of the object is allowed, the access controlling unit 15 sends the allowance of the use of the object to the printer controller 51 through the job controlling unit 14, and the process proceeds to step 510. If it is not judged that the use of the object is allowed, the process proceeds to step 57.

[S7] when the user holding the job is not allowed to use the questioned object, the access controlling unit 15 causes the processing judging section 151 in the access controlling unit to judge the manner of performing print processing. If the processing judging section 151 judges that the print is to be stopped, the processing is ended. If the processing judging section 151 does not judge that the print operation is to be stopped, the process proceeds to step S8. If the object which is not allowed is the font object of the logo of the company name, the processing judging section 151 judges that the print operation is to be stopped, on the basis of a corresponding definition which is not shown. As a result, the print operation is stopped and the job is ended without being processed.

[S8] The processing judging section 151 judges whether an alternative object that can be used in place of the object the use of which has not been allowed is to be selected, or the printing process relating to the object is to be abandoned and the printing process is to be continued by using only an object the use of which has been allowed. If an alternative object is to be selected, the process proceeds to step S9. If the printing process relating to the object is to be abandoned, the process proceeds to step S10. In the case where the object the use of which has not been allowed is the object of two-sided printing, for example, two-sided printing is abandoned and printing on one side is executed.

[S9] The processing judging section 151 selects an alternative object that can be used in place of the object the use of which has not been allowed, and sends the allowance of the use of the selected alternative object to the printer controller 51 through the job controlling unit 14. When the font object of the logo of the company name is allowed to be used and the red-toner object is not allowed to be used, for example, the black-toner object is selected in place of the red-toner object.

[S10] In the judging process of the processing judging section 151, it is judged whether the inquiry and the reception of the answer to the inquiry have ended for all objects indicated in the job. If the inquiring process has been ended for all objects, the process proceeds to step S11. If there remains an object about which the inquiry is to be performed, the process returns to step S5.

[S11] The printer controller 51 generates a control code corresponding to the printer engine 52 in accordance with the object the use of which has been allowed, thereby causing the printer engine 52 to execute actual imaging processing.

Next, user authentication which is performed for plural network systems connected to a print server and in different manners for respective networks will be described. First, an example of the configuration of an authentication table disposed in, for example, the user verifying unit 12 of the print server 10 will be described.

Figure 3:
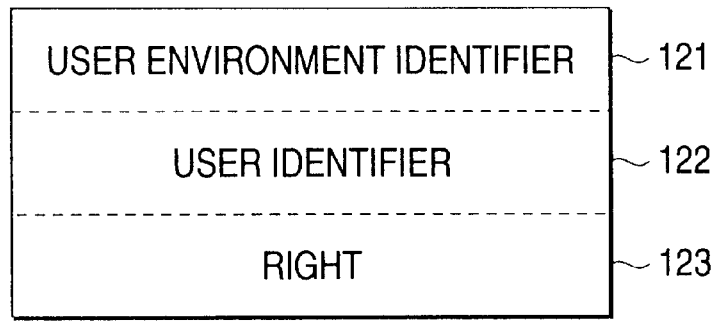
FIGS. 3(A) and 3(B) are diagrams showing examples of the configuration of an authentication table.
Figure 3:
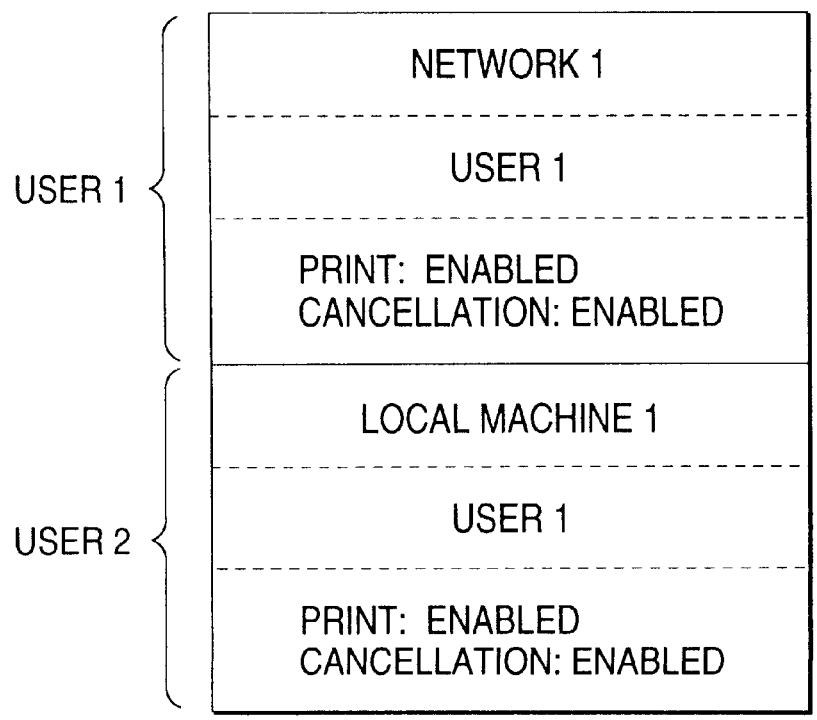

FIGS. 3(A) and 3(B) are diagrams showing examples of the configuration of an authentication table for deciding whether the verified user is authorized to access an object required for executing the print job. In the diagrams, FIG. 3(A) shows the basic configuration of the authentication table which, for each user, comprises a "USER ENVIRONMENT IDENTIFIER" column 121, a "USER IDENTIFIER" column 122, and a "RIGHT" column 123. In the "USER ENVIRONMENT IDENTIFIER" column 121, the name of the network (the domain name) in which the user logs, the name of the machine, and the like are written. In the "USER IDENTIFIER" column 122, the user name of the user environment is written. In the "RIGHT" column 123, the description indicating whether an operation on the printer is allowed to the user is made.

FIG. 3(B) shows a specific example of the description of the authentication table. In the example, two users are set. Namely, "user 1" is set in such a manner that the user environment identifier is "NETWORK1," the user identifier is "USER1," and the right is "PRINT: ENABLED, CANCELLATION: ENABLED," and "user 2" in such a manner that the user environment identifier is "LOCALMACHINE1," the user identifier is "USER1," and the right is "PRINT: ENABLED, CANCELLATION: DISABLED." In the example, the user identifiers or the user names are identical with each other. However, the user environment identifiers are different from each other. Consequently, the users are deemed as different users and have different rights. Unless both the user environment identifiers and the user identifiers are identical with each other, therefore, the print server judges that the user is not verified and rejects the reception of an object.

Alternatively, the user environment identifier may be omitted from the authentication table, so that a user can execute the same operation from any environment as far as the use can clear authentication level.

The set values in the user authentication level definition table, the security policy definition table, and the authentication table can be registered or changed by the administrator of the print server in a direct or external manner, i.e., from an arbitrary client. Also a registration or change of an operation which can be executed by the user can be controlled by registering such a registration or change in the "RIGHT" column of the authentication table.

Figure 4:
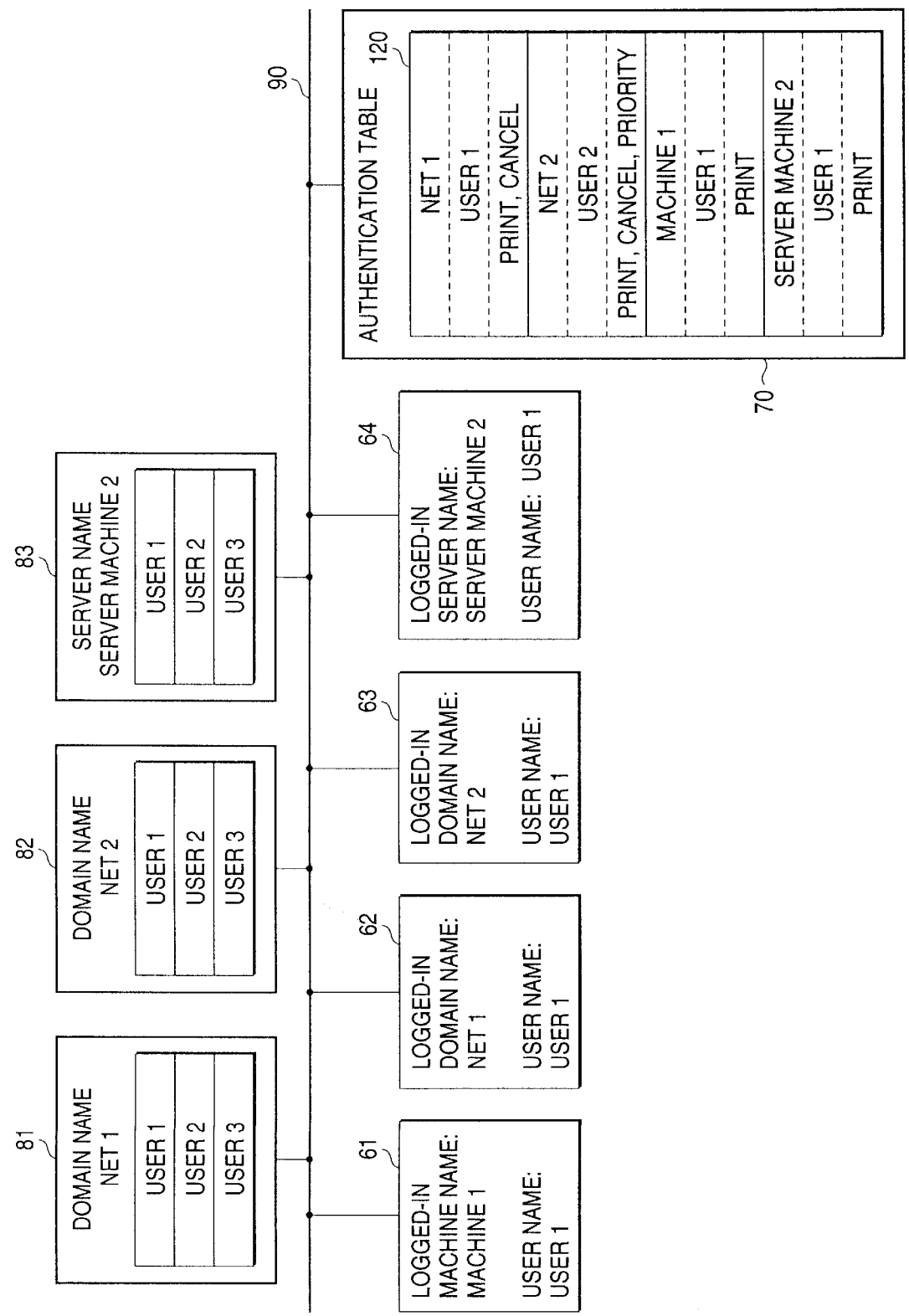
FIG. 4 is a diagram illustrating a control executed when each client requests an operation.

FIG. 4 is a diagram illustrating a control executed when each client requests an operation.

The figure shows an example in which four clients 61, 62, 63, and 64, a print server 70, two authentication servers 81 and 82, and one arbitrary server 83 are connected to a network 90. The client 61 is a standalone client which does not belong to any authentication server of the network system. In the client 61, the name of a machine in which the client logs is "MACHINE1," and the user name is "USER1." The client 62 belongs to the first authentication server 81. In the client 62, the name of a domain in which the client logs is "NET1," and the user name is "USER1." The client 63 belongs to the second authentication server 82. In the client 63, the name of a domain in which the client logs is "NET2," and the user name is "USER1." The client 64 belongs to the server 83. In the client 64, the name of a server in which the client logs is "ServerMachine2," and the user name is "USER1." In other words, all the user names of the clients 61, 62, 63, and 64 are "USER1." In an authentication table 120 of the print server 70, information of the user environment identifier, the user identifier, and the right is set in such a manner that "NET1; USER1; PRINT, CANCEL" are set for the first user, "NET2; USER2; PRINT, CANCEL, PRIORITY" are set for the second user, "MACHINE1; USER1; PRINT" are set for the third user, and "ServerMachine2; USER1; PRINT" are set for the fourth user. Furthermore, the user names which are to be authenticated in the domain name "NET1" are registered in the first authentication server 81, those which are to be authenticated in the domain name "NET2" are registered in the second authentication server 82, and those which are effective in the server 83 are registered in the server 83.

Here, the access control in the case where the users who log in the respective clients 61, 62, 63, and 64 request the print server 70 to perform the print operation will be described. It is assumed that, when the authentication table 120 of the print server 70 is to be referred, the user authentication corresponding to the authentication level has been completed. The description of the user authentication will be omitted.

With respect to the first client 61, the authentication table 120 of the print server 70 contains data in which the machine name and the user name coincide with those of the client. In the data, the print right is set. When the user of a user name "USER1" logs in the client of a machine name "MACHINE1,", the print operation by the user is allowed so that the print operation is enabled.

With respect to the second client 62, the authentication table 120 of the print server 70 contains data in which the domain name and the user name coincide with those of the client. In the data, the print right is set. Therefore, the user of a user name "USER1" who logs in the domain name "NET1" has the print right so that the print operation is enabled.

With respect to the third client 63, the authentication table 120 of the print server 70 contains no data relating to the user of a user name "USER1" who logs in the domain name "NET2." Therefore, all operations by the user are disabled.

With respect to the fourth client 64, the authentication table 120 of the print server 70 contains data in which the server name and the user name coincide with those of the client. In the data, the print right is set. Therefore, the user of a user name "USER1" who logs in the server 83 of the server name "ServerMachine2" has the print right so that the print operation is enabled.

Next, the case where the first and second clients 61 and 62 request the print server 70 to perform the cancel operation will be described.

With respect to the first client 61, the authentication table 120 of the print server 70 contains data in which the machine name and the user name coincide with those of the client, but the cancel right is not set. Therefore, the cancel operation from the client 61 is disabled.

With respect to the cancel operation from the second client 62, the authentication table 120 of the print server 70 contains data in which the domain name and the user name coincide with those of the client, and the cancel right is set for the data. Therefore, the cancel operation from the client is enabled.

Next, the support of authentication in the print server will be described.

In the print server, there are authentication which the user verifying unit can interpret (which is supported), and that which the user verifying unit cannot interpret (which is not supported). A job sent from a client is received by the job receiving unit of the print server, and then transferred to the user verifying unit in order to perform user authentication. When the user verifying unit cannot interpret the authentication information attached to the job, the user verifying unit notifies the job receiving unit of this. In response to this notification, the job receiving unit notifies the client that an authentication error has occurred.

In the print server, moreover, the administrator of the print server can previously set the manner of handling the authentication level which is obtained as a result of user authentication, i.e., in an enabled operation definition table shown in FIG. 7, the support authentication level with respect to whether an operation is allowed or not.

This information is held in, for example, the user verifying unit. For example, it is assumed that the print server has set the high and middle levels as an object of the operation allowance for the authentication level. When the authentication level for the requested operation is at the high or middle level, the level coincides with the authentication level allowed by the print server. Therefore, the job and its is authentication level are transferred to the job controlling unit and the print processing is continued. By contrast, when the authentication level for the requested operation is at the low level, the level fails to coincide with the authentication level allowed by the print server. Therefore, the occurrence of an error is notified to the client and the job processing is stopped.

Next, the case where user information is actually sent from a client to the print server will be described. In the client, the user information acquiring unit produces an identification of the user. At the same time, the client obtains information such as the kind of the operating system, the network system, the name of the domain in which the user logs, and the machine name, as the user environment. Thereafter, the information is encrypted together with the user name designated by the user, on the basis of an encryption key which is preset by the print server, and then the encrypted information is sent to the print server. Information related to the authentication level is included in the identification. In the print server, the encrypted data sent from the client are decoded, so that the user name and the identification are obtained.

In the embodiment described above, after authentication of a user, it is checked whether an operation by the user is allowed or not, and, if allowed, it is further checked whether an object required for the print job can be accessed or not. It is a matter of course that the user authentication, an operation by the user, and the access to an object may be independently used, or that they are used with being arbitrarily combined with each other.

As described above, according to the invention, a user name and an authentication level to which an identification is attached are employed as information for user authentication, and hence both a user from a client which has an authentication scheme, and a user from a client which has no authentication scheme and hence cannot identify a user, can be authenticated with suitable security. Since the middle security level is set, a user authentication scheme used in a client environment can be used as it is, and a special authentication service or a name service is not necessary.

In the print server, the level to be supported can be set in accordance with the installation environment of the user, and hence a delicate access control can be realized.

The employment of user authentication in an operation of a printer can enhance the effect in security. Moreover, the network is not restricted to one network system and different networks are subjected to authentication in different manners. Even in the case where different network environments mixedly exist, therefore, it is possible to cope with user authentication of each of the networks.

Furthermore, access control information of a user is stored while being attached to an object required for executing print processing, and, when the print operation is to be executed, an access control is performed 80 as to check whether the user who requests the print operation can use the object. Therefore, an access control can be performed in the unit of an object for each individual user, and an access control relating to the print operation can be performed in a suitable manner ranging from a coarse one to a fine one, in accordance with the necessary environment.

Specifically, a coarse control such as only a certain user is allowed to use a specific printer, is possible, and also a fine control such as only a certain user is allowed to perform full color printing on an OHP sheet, is enabled.

What is claimed is:

1. A print processing multilevel security apparatus which processes print instructions in plural protocols, comprising:
   user information producing means for producing an identification which identifies a user as a sole user in an environment of a client;
   operation instructing means for issuing instructions of operations relating to print processing with said identification;
   authenticating means for performing a service of user authentication;
   support authentication level storing means for storing a security policy indicating whether it is necessary to verify correctness of the identification;
   correctness inquiry judging means for judging whether it is necessary to verify correctness of the identification, in accordance with the security policy, when receiving the operation output from said operation instructing means;
   user verifying means for verifying correctness of the user in response to an inquiry of correctness of the identification, when the security policy indicates that correctness is to be verified; and
   operation controlling means for restricting operations on a printer to an operation without restricting the user's access to the printer, wherein the operation that is allowed to the user is verified by said user verifying means.

2. A print processing multilevel security apparatus according to claim 1, wherein said user verifying means further comprises level verifying means for, when the security policy indicates that correctness of the identification is to be verified, performing high-level verification which uses a user authentication service in which the user can be verified as the sole user in any multinetwork environment, and low-level verification which uses a conventional print protocol and which cannot verify any user but can verify only a kind of protocol.

3. A print processing multilevel security apparatus according to claim 1, wherein, for an environment of each client, said user information producing means produces a new identification from a result obtained by an authentication scheme used by the client, and, when the security policy indicates that correctness of the identification is to be verified, said level verifying means of said user verifying means performs middle-level verification for verifying that the new identification is correctly obtained by the authentication scheme of the client.

4. Print processing multilevel security apparatus according to claim 1, wherein, when a level is verified in verification of correctness of the identification in said user verifying means, said operation controlling means performs a control in which a low-level user cannot issue an operation on a print job of a high level user.

5. A print processing multilevel security apparatus according to claim 1, wherein said operation controlling means further comprises judging means for, when the user is not authorized to use an object required for print processing indicated in a job, judging whether an alternative object is to be used or a print operation is to be stopped.

6. A print processing multilevel security apparatus according to claim 1, wherein said operation control means further comprises distinguishing means for distinguishing whether the user is authorized to perform predetermined operations on said printer.

* * * * *